United States Patent
Thomson

(10) Patent No.: US 9,375,105 B2
(45) Date of Patent: Jun. 28, 2016

(54) ADJUSTABLE HEADBAND PILLOW

(71) Applicant: GK Thomson, LLC, Carnegie, PA (US)

(72) Inventor: Gregory K. Thomson, Carnegie, PA (US)

(73) Assignee: GK Thomson Development, LLC, Carnegie, PA (US)

( * ) Notice: Subject to any disclaimer, the term of this patent is extended or adjusted under 35 U.S.C. 154(b) by 0 days.

(21) Appl. No.: 13/920,557

(22) Filed: Jun. 18, 2013

(65) Prior Publication Data
US 2014/0101823 A1 Apr. 17, 2014

Related U.S. Application Data

(63) Continuation-in-part of application No. 13/649,205, filed on Oct. 11, 2012.

(60) Provisional application No. 61/642,687, filed on May 4, 2012.

(51) Int. Cl.
| | |
|---|---|
| *A42B 7/00* | (2006.01) |
| *A47G 9/10* | (2006.01) |
| *A42B 1/24* | (2006.01) |
| *A47C 7/38* | (2006.01) |
| *B60N 2/48* | (2006.01) |

(52) U.S. Cl.
CPC ............... *A47G 9/1045* (2013.01); *A42B 1/24* (2013.01); *A47C 7/383* (2013.01); *B60N 2/4879* (2013.01)

(58) Field of Classification Search
CPC .......... A42B 1/066; A42B 7/00; A41B 1/046; A61F 9/04; A47C 7/383; A47C 7/38; A47C 20/02; A47C 7/021; A47C 7/386; A47C 7/425; A47G 9/10; A47G 2009/003; A47G 9/1045; A47G 9/1081; B60N 2/4879; B60N 2/2851; B60N 2/2872; B60N 2/4882; B60N 2/2881; B60N 2/48; Y10S 128/23; A61G 7/072; A41D 20/00; A61H 2201/1607
USPC .............. 5/640, 636; 2/172, 173, 15; 297/393
See application file for complete search history.

(56) References Cited

U.S. PATENT DOCUMENTS

| | | | | | |
|---|---|---|---|---|---|
| 2,463,728 | A | * | 3/1949 | Wallin | 248/118 |
| 2,696,007 | A | * | 12/1954 | Larkin et al. | 2/171 |
| D247,312 | S | * | 2/1978 | Zeiss | D24/215 |
| D250,835 | S | * | 1/1979 | Grube | D24/215 |
| 4,166,459 | A | * | 9/1979 | Nightingale | 602/35 |
| D253,790 | S | * | 12/1979 | Grube | D24/215 |
| 4,297,994 | A | * | 11/1981 | Bashaw | 5/637 |
| 4,520,510 | A | * | 6/1985 | Daigle | 2/452 |

(Continued)

FOREIGN PATENT DOCUMENTS

| | | |
|---|---|---|
| CA | 2 532 435 | 12/2009 |
| CN | 862 018 72 | 8/1987 |

(Continued)

*Primary Examiner* — Bobby Muromoto, Jr.
(74) *Attorney, Agent, or Firm* — Emerson Thomson Bennett, LLC; Daniel A. Thomson

(57) ABSTRACT

A headband includes an inside surface and an outside surface, at least two cushions, wherein the cushions are removably attachable to the outside surface of the headband, wherein the cushion is slidably adjustable along the headband, and a second band, wherein the second band has first and second ends, wherein the first and second ends of the second band are attached to the inside or outside surface

17 Claims, 20 Drawing Sheets

(56) References Cited

U.S. PATENT DOCUMENTS

Figure 1:
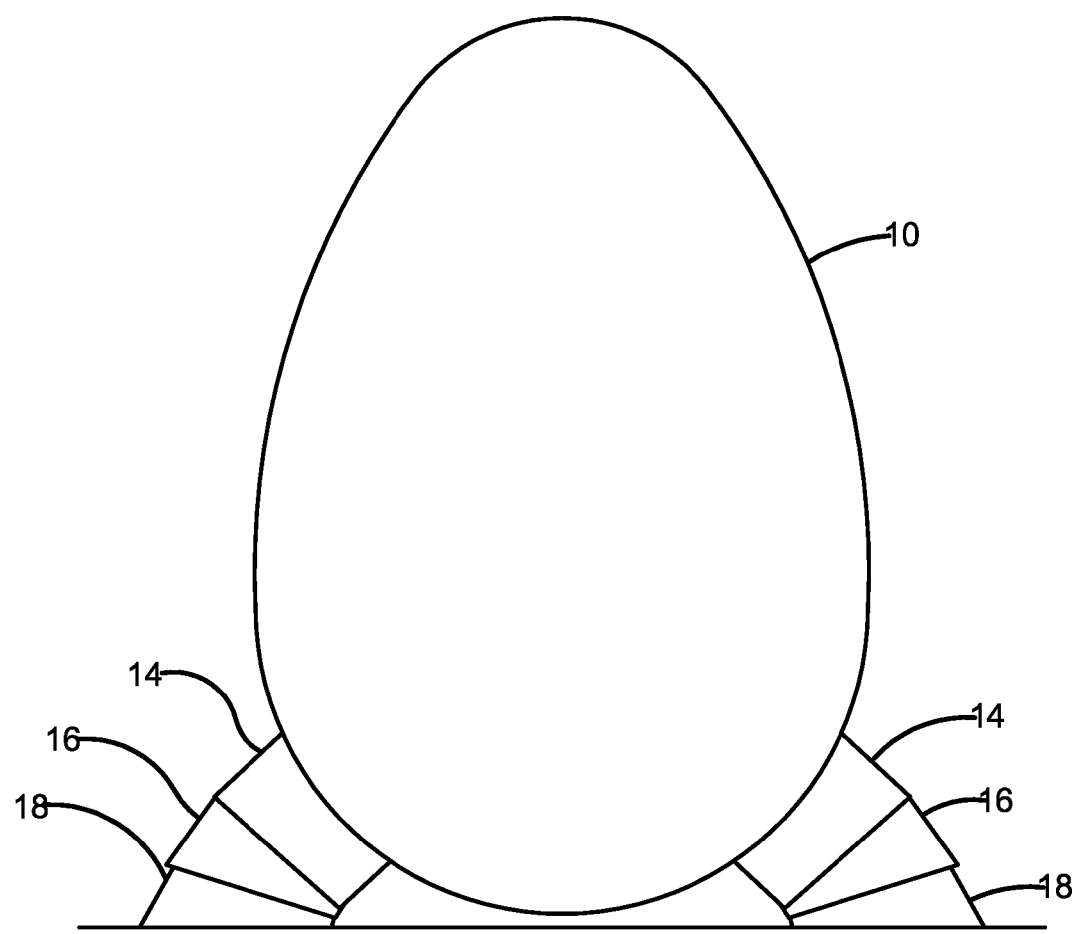

| | | | | |
|---|---|---|---|---|
| 4,576,150 | A * | 3/1986 | Auracher | 602/18 |
| 4,621,378 | A * | 11/1986 | Hatchman | 2/9 |
| 4,679,263 | A * | 7/1987 | Honer | 5/640 |
| 4,712,254 | A * | 12/1987 | Daigle | 2/452 |
| 4,768,246 | A * | 9/1988 | Summer | 5/640 |
| 4,776,049 | A * | 10/1988 | Perron | 5/640 |
| 4,955,087 | A * | 9/1990 | Perez et al. | 2/12 |
| D312,019 | S * | 11/1990 | Woods et al. | D6/601 |
| 5,129,109 | A * | 7/1992 | Runckel | 2/440 |
| 5,205,611 | A * | 4/1993 | Stephens | 297/391 |
| 5,265,165 | A * | 11/1993 | Rauch | 381/309 |
| 5,378,042 | A * | 1/1995 | Daneshvar | 297/393 |
| 5,454,781 | A * | 10/1995 | Chitwood | 602/18 |
| 5,505,523 | A * | 4/1996 | Wang | 297/393 |
| 5,544,378 | A * | 8/1996 | Chow | 5/644 |
| 5,567,015 | A * | 10/1996 | Arias | 297/397 |
| 5,581,807 | A * | 12/1996 | Peterson | 2/10 |
| 5,875,493 | A * | 3/1999 | MacDonald et al. | 2/172 |
| 5,940,886 | A * | 8/1999 | McCarthy Smith | 2/206 |
| 5,974,607 | A * | 11/1999 | Smith | 5/636 |
| 6,098,628 | A * | 8/2000 | Funk | 128/859 |
| 6,123,389 | A * | 9/2000 | O'Connor et al. | 297/397 |
| 6,193,740 | B1 * | 2/2001 | Rodriguez | 606/204.25 |
| 6,209,959 | B1 * | 4/2001 | Meye | 297/393 |
| 6,266,832 | B1 * | 7/2001 | Ezell | 5/640 |
| 6,289,538 | B1 * | 9/2001 | Fidge | 5/640 |
| 6,301,716 | B1 * | 10/2001 | Ross | 2/171 |
| 6,305,749 | B1 * | 10/2001 | O'Connor et al. | 297/397 |
| 6,321,390 | B1 * | 11/2001 | Chiang | 2/428 |
| 6,347,421 | B1 * | 2/2002 | D'Emilio | 5/636 |
| 6,389,595 | B1 * | 5/2002 | Hunter | 2/12 |
| 6,575,533 | B1 * | 6/2003 | Kicos | 297/397 |
| 6,594,839 | B1 * | 7/2003 | Papay | 5/637 |
| 6,607,245 | B1 * | 8/2003 | Scher | 297/393 |
| 6,637,059 | B1 * | 10/2003 | Baker | 5/644 |
| 6,641,220 | B2 * | 11/2003 | Clegg | 297/393 |
| 6,648,416 | B2 * | 11/2003 | O'Connor et al. | 297/397 |
| 6,748,615 | B1 * | 6/2004 | Tiedemann | 5/640 |
| 6,826,784 | B2 * | 12/2004 | Patire | 2/433 |
| 6,854,465 | B2 * | 2/2005 | Bordewick et al. | 128/207.11 |
| 6,893,094 | B2 * | 5/2005 | O'Connor | 297/397 |
| 6,938,958 | B2 * | 9/2005 | Gold et al. | 297/397 |
| 7,093,903 | B2 * | 8/2006 | O'Connor et al. | 297/397 |
| 7,146,663 | B2 * | 12/2006 | Brown et al. | 5/636 |
| 7,188,625 | B2 * | 3/2007 | Durette | 128/858 |
| 7,428,763 | B2 * | 9/2008 | Hightower | 5/636 |
| D593,352 | S * | 6/2009 | Sherwin | D6/601 |
| 7,690,052 | B2 | 4/2010 | Saladino | |
| 7,797,773 | B1 * | 9/2010 | Wilk | 5/640 |
| 7,832,802 | B2 * | 11/2010 | Ehlers et al. | 297/393 |
| 7,836,522 | B2 * | 11/2010 | Blecha | 2/207 |
| 8,074,311 | B2 * | 12/2011 | Haynesworth | 5/652 |
| 8,239,987 | B2 * | 8/2012 | Sharp | 5/639 |
| 8,316,488 | B2 * | 11/2012 | Rojas | 5/637 |
| 8,382,692 | B1 * | 2/2013 | Chao | 602/18 |
| 8,662,590 | B2 * | 3/2014 | Bogen | 297/393 |
| 8,726,419 | B2 * | 5/2014 | Vahey | 2/173 |
| 8,783,776 | B1 * | 7/2014 | Perkins | 297/392 |
| 8,983,569 | B2 * | 3/2015 | Lee | 600/383 |
| 2002/0005819 | A1 * | 1/2002 | Ronzani et al. | 345/8 |
| 2002/0138891 | A1 * | 10/2002 | Spiteri | 2/15 |
| 2004/0019948 | A1 * | 2/2004 | Patire | 2/15 |
| 2004/0069302 | A1 * | 4/2004 | Wilson et al. | 128/201.24 |
| 2004/0245832 | A1 * | 12/2004 | Miller | 297/393 |
| 2005/0060781 | A1 * | 3/2005 | Landers | 2/15 |
| 2006/0072068 | A1 * | 4/2006 | Landers | 351/41 |
| 2006/0097880 | A1 * | 5/2006 | McEvoy | 340/573.1 |
| 2006/0243286 | A1 * | 11/2006 | Durette | 128/858 |
| 2007/0093685 | A1 * | 4/2007 | Bighetty | 600/26 |
| 2007/0109492 | A1 * | 5/2007 | Abraham | 351/45 |
| 2007/0118971 | A1 * | 5/2007 | Blecha | 2/207 |
| 2008/0184489 | A1 * | 8/2008 | Pham | 5/636 |
| 2008/0190432 | A1 * | 8/2008 | Blochlinger et al. | 128/205.25 |
| 2008/0216244 | A1 * | 9/2008 | Minton | 5/640 |
| 2009/0193559 | A1 * | 8/2009 | Ritchey | 2/15 |
| 2009/0236893 | A1 * | 9/2009 | Ehlers et al. | 297/391 |
| 2009/0271904 | A1 * | 11/2009 | Bentley | 2/15 |
| 2010/0199411 | A1 * | 8/2010 | Kaiser | 2/440 |
| 2010/0200003 | A1 * | 8/2010 | Armstrong | 128/869 |
| 2010/0283310 | A1 * | 11/2010 | Blackwood | 297/464 |
| 2011/0043025 | A1 * | 2/2011 | Park | 297/393 |
| 2011/0271421 | A1 * | 11/2011 | Vahey | 2/173 |
| 2012/0068515 | A1 * | 3/2012 | Bogen | 297/393 |
| 2012/0210516 | A1 * | 8/2012 | Popovic | 5/640 |
| 2013/0278886 | A1 * | 10/2013 | Vollet | 351/158 |
| 2013/0305432 | A1 * | 11/2013 | Thomson | 2/181 |
| 2014/0115762 | A1 * | 5/2014 | Kaiser | 2/440 |
| 2014/0150155 | A1 * | 6/2014 | Sessions | 2/15 |
| 2014/0215688 | A1 * | 8/2014 | Vahey | 2/209.3 |
| 2014/0259290 | A1 * | 9/2014 | Dickerson | 2/209.13 |
| 2014/0311512 | A1 * | 10/2014 | Owoc | 132/200 |
| 2014/0378808 | A1 * | 12/2014 | Lee | 600/383 |
| 2015/0047086 | A1 * | 2/2015 | Mayes | 2/10 |
| 2015/0103152 | A1 * | 4/2015 | Qin | 348/53 |

FOREIGN PATENT DOCUMENTS

| | | |
|---|---|---|
| FR | 2 815 524 | 10/2000 |
| GB | 234 9812 | 11/2000 |
| WO | 2011 145087 | 11/2011 |
| WO | PCT/US 2014/042060 | 10/2014 |

* cited by examiner

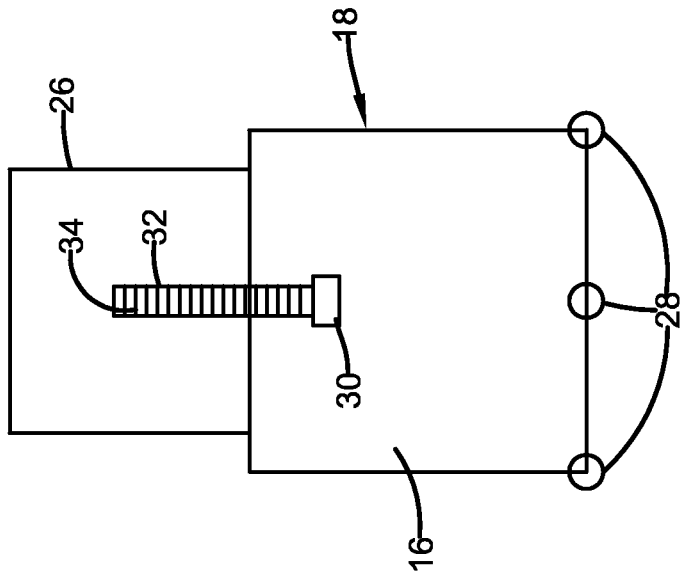
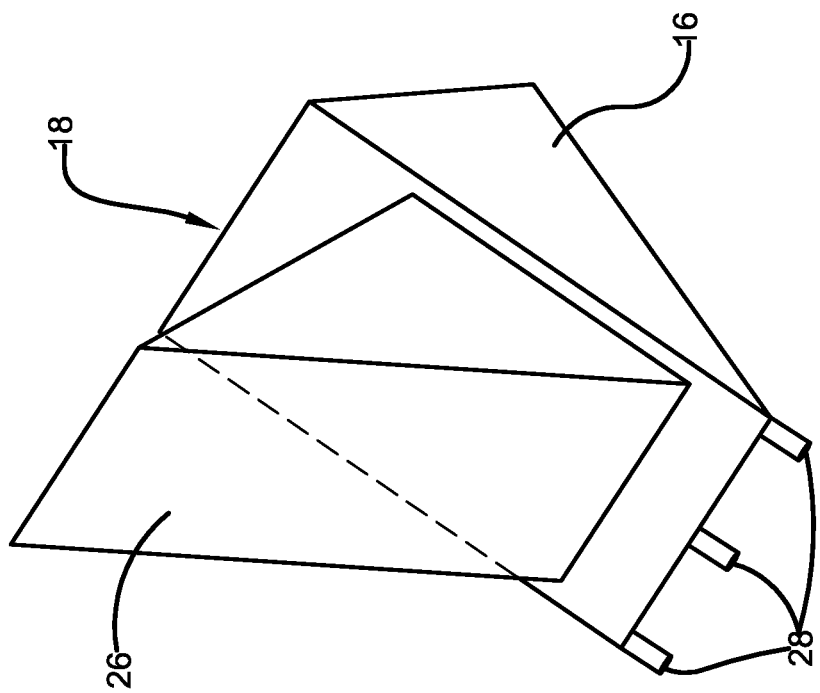

ADJUSTABLE HEADBAND PILLOW

This application is a continuation-in-part patent application of U.S. Ser. No. 13/649,205, filed Oct. 11, 2012, which claims priority to U.S. Ser. No. 61/642,667, filed May 4, 2012, the contents of which are incorporated herein by reference. This invention generally relates to methods and apparatuses for pillows, and more particularly to pillows that can be worn as a headband.

I. BACKGROUND

A. Field
B. Description of the Related Art
Currently, finding comfortable ways to sleep in planes, cars, or other modes of travel can be difficult and frustrating.

II. SUMMARY

In one embodiment, a headband includes an inside surface and an outside surface and at least one cushion, wherein the cushion is removably attachable to the outside surface of the headband, wherein the cushion is slidably adjustable along the headband.

In another embodiment, the headband further includes at least one holding device for holding the cushion, wherein the holding device is slidably adjustable along the headband.

In another embodiment, the headband includes at least one frame, wherein the frame is attached to the holding device, and the cushion is in the frame.

In another embodiment, the at least one cushion is at least two cushions.

In another embodiment, the headband is made of an elastic material.

In another embodiment, the headband has two ends that can be connected to each other, wherein the size of the headband is adjustable.

In another embodiment, the cushion is adjustable within the frame.

In another embodiment, the headband includes a height adjustment mechanism, wherein the cushion can be selectively adjusted in or out of the frame.

In another embodiment, the frame is connected to the holding device by at least one peg.

In another embodiment, the cushion has a removable cover.

In another embodiment, the headband includes selectively removable eye protection, wherein the eye protection can be selectively attached to the headband.

In another embodiment, a headband includes an inside surface and an outside surface, a holding device, at least one bladder, wherein the bladder is contained within the holding device, wherein the holding device is removably attachable to the outside surface of the headband, wherein the holding device is slidably adjustable along the headband, and at least one bladder hole.

In another embodiment, the headband includes a bladder pocket, wherein the pocket has a selectively sealable opening.

In another embodiment, the bladder is filled with at least one of the group comprising a fluid, a gel, and pellets.

In another embodiment, the fluid can be a liquid or a gas.

In another embodiment, the at least one bladder is at least two bladders.

In another embodiment, the headband has an additional support band, which although limited to such, is intended for use with infants or other individuals who might have difficulty keeping the device on their heads.

In another embodiment, the supports are not an elastic band, and do not cover the entire circumference of the user's head.

The current embodiment provides an effective means of providing neck and head support in many different places. Other benefits and advantages will become apparent to those skilled in the art to which it pertains upon reading and understanding of the following detailed specification.

III. BRIEF DESCRIPTION OF THE DRAWINGS

Figure 2:
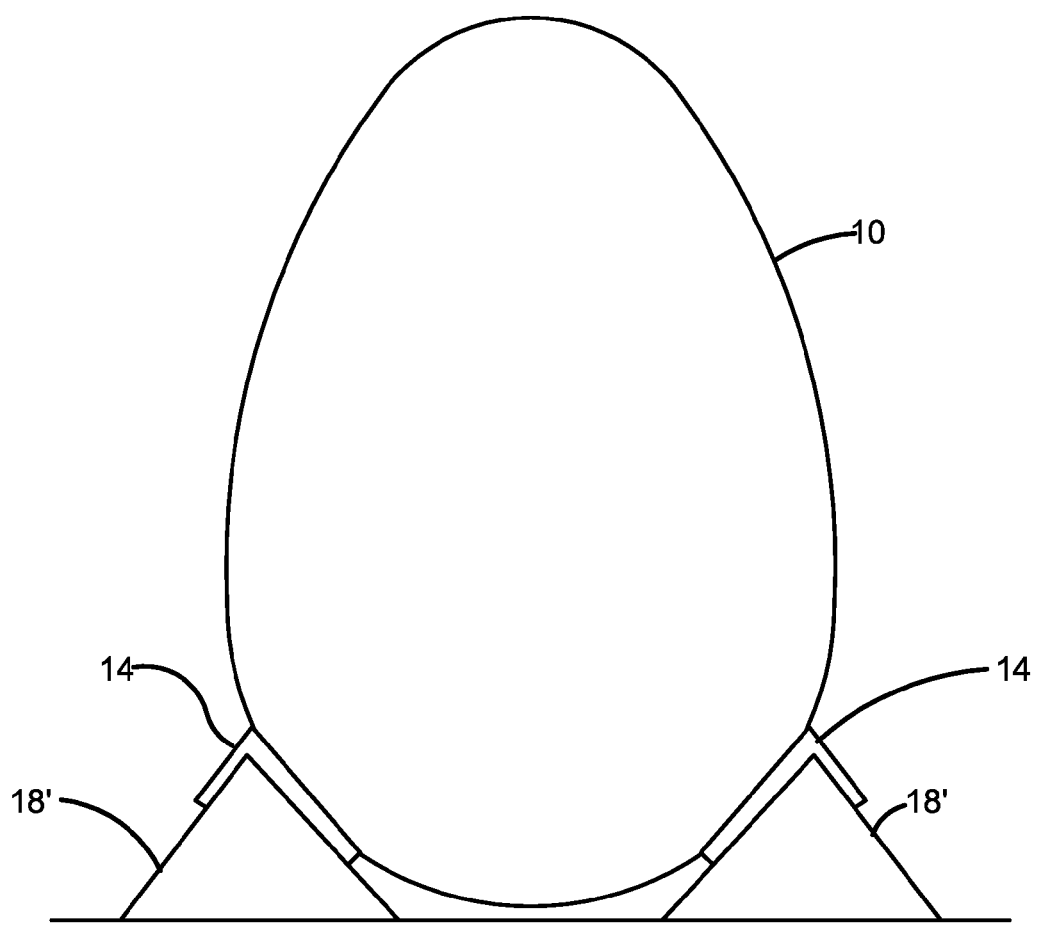
Figure 3:
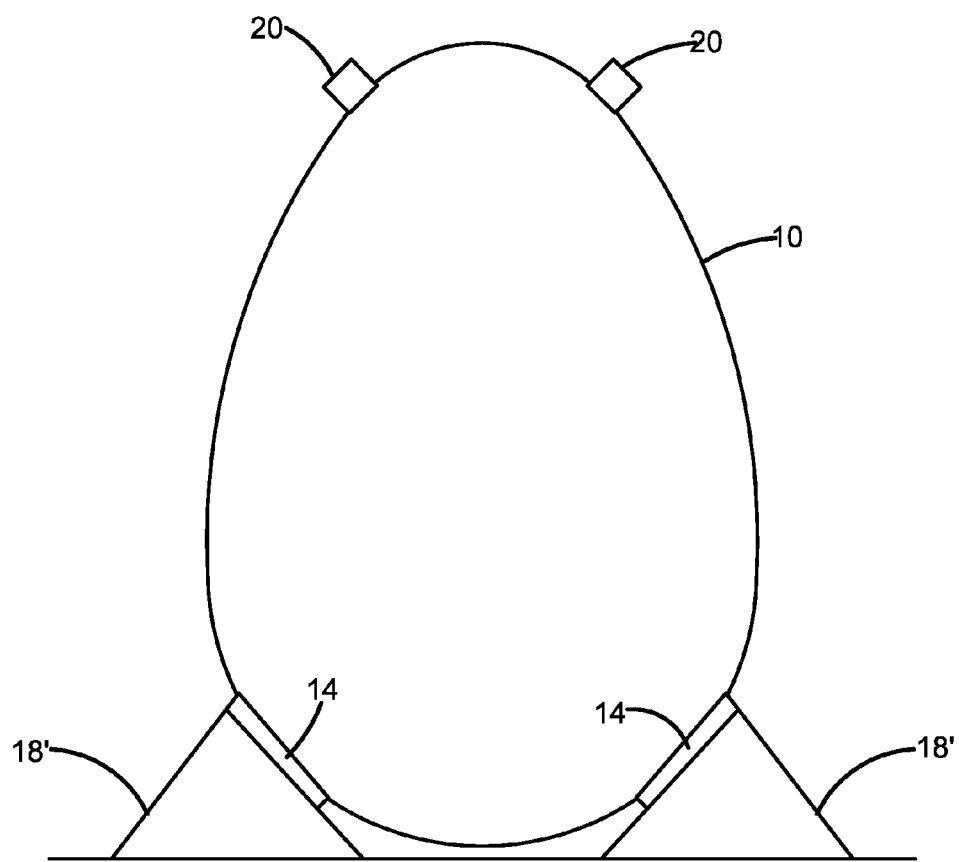
Figure 4:
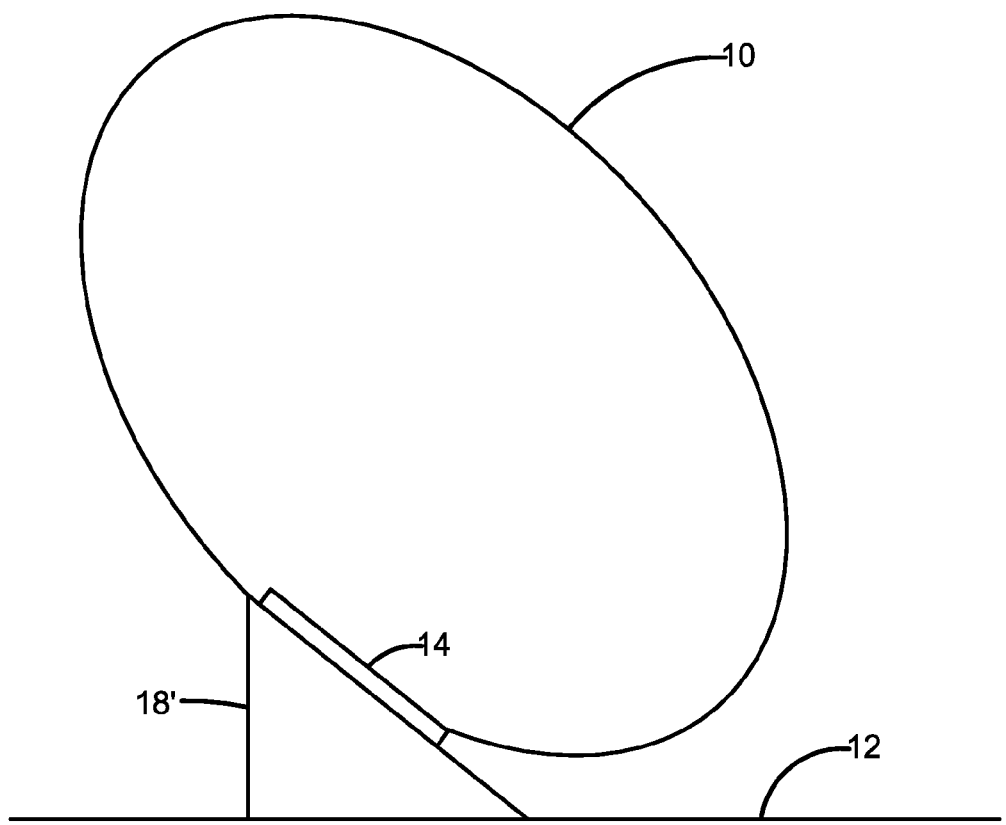
Figure 5A:
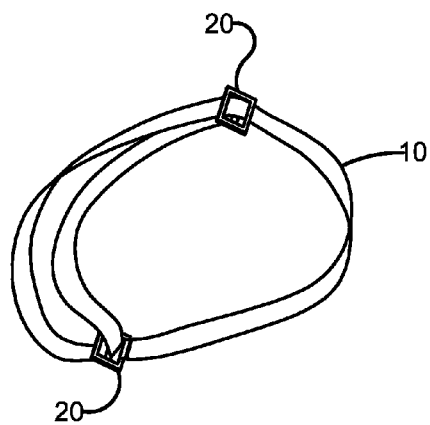
Figure 5B:
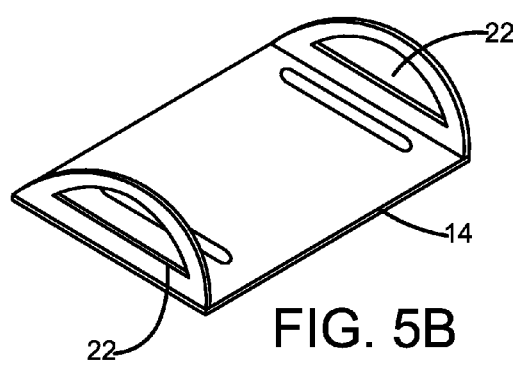
Figure 5C:
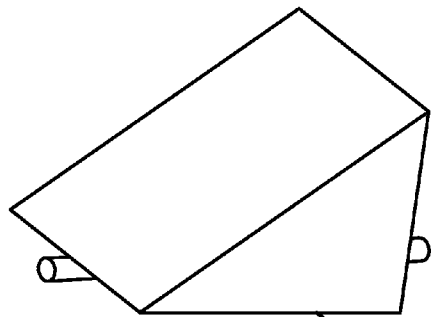
Figure 5D:
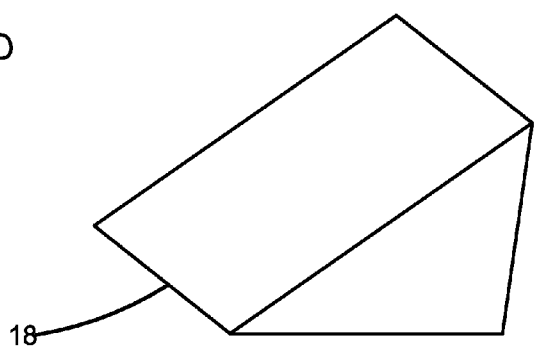
Figure 6:
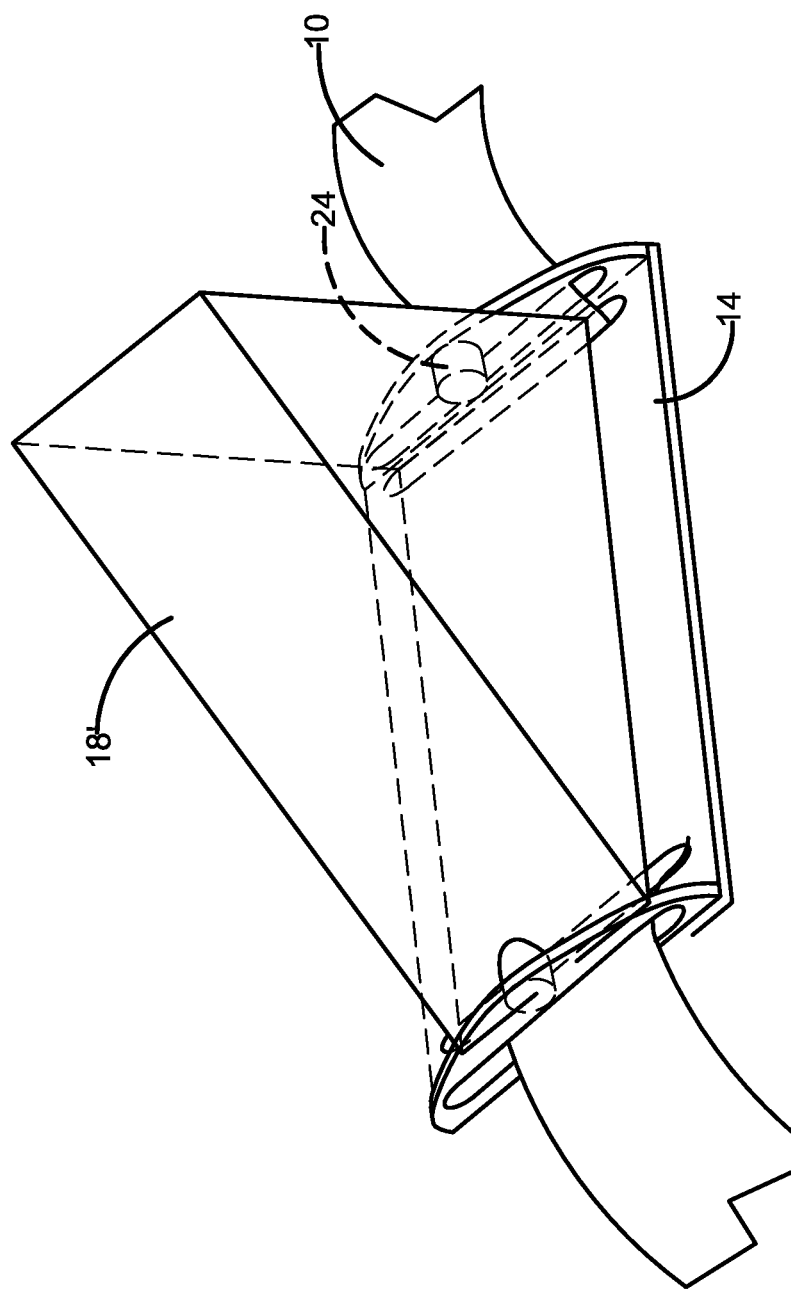
Figure 7:
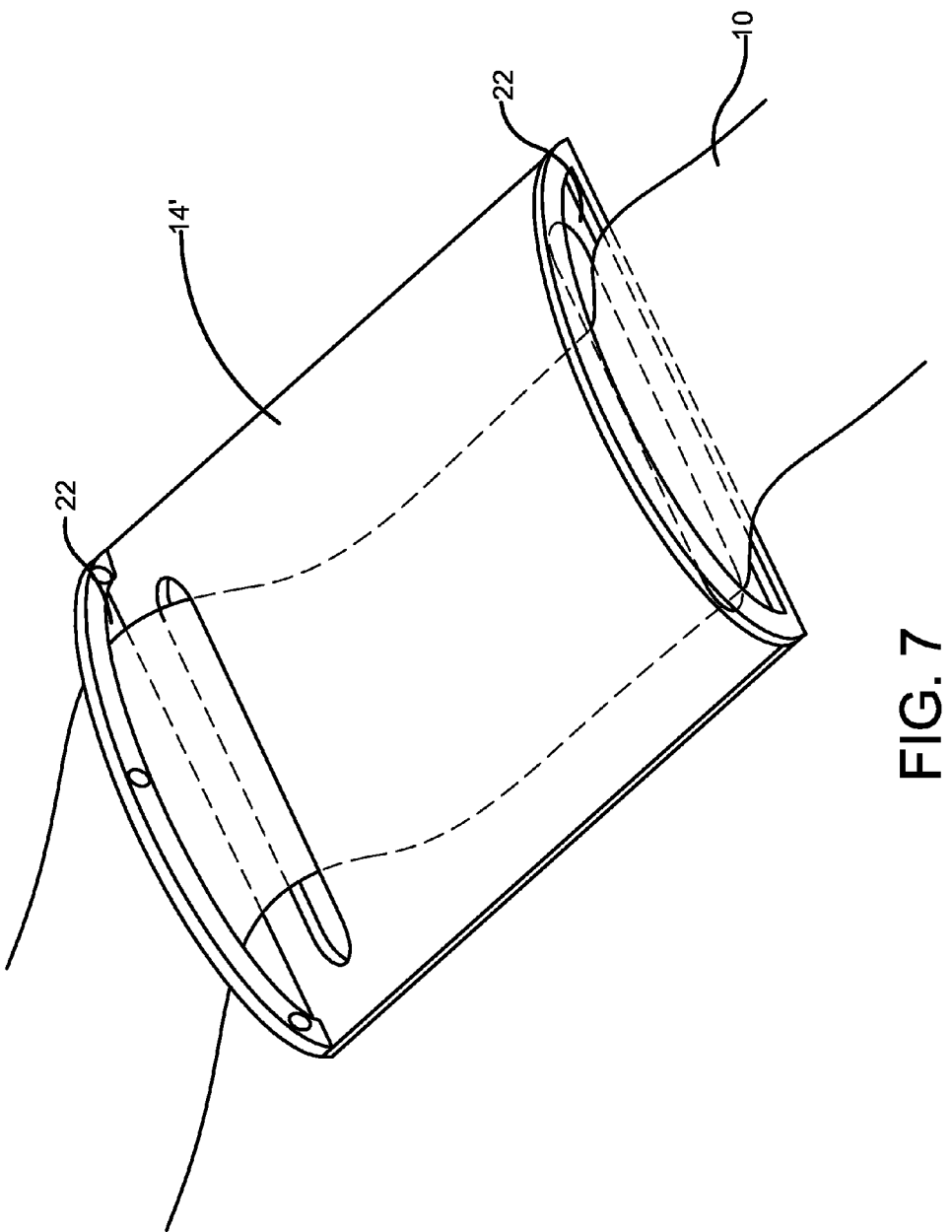
Figure 8A:
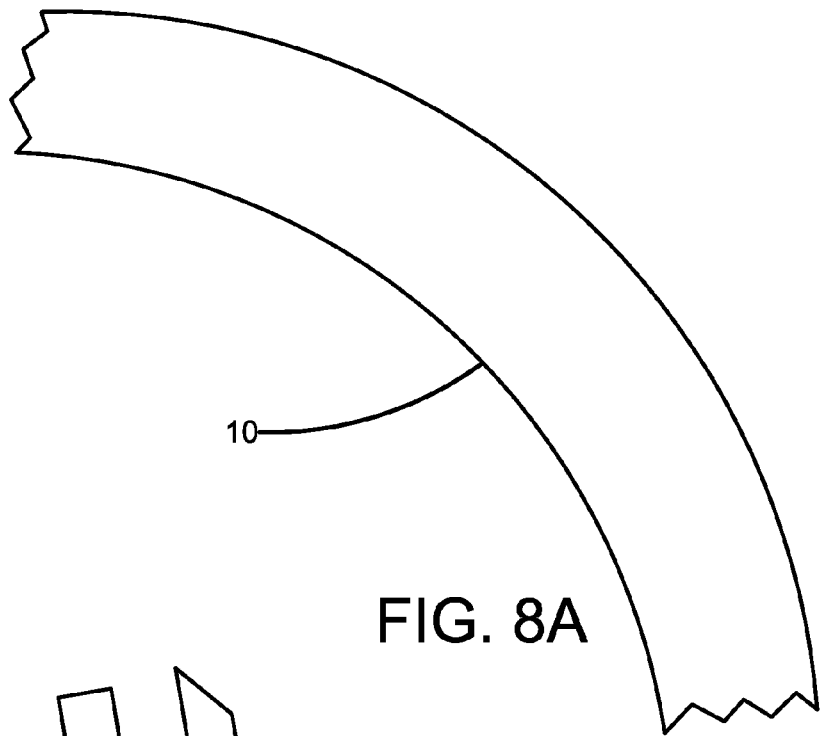
Figure 8B:
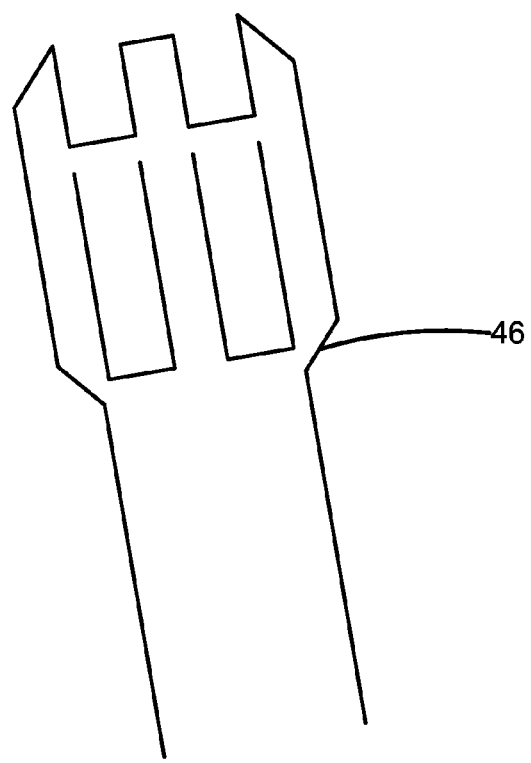
Figure 10:
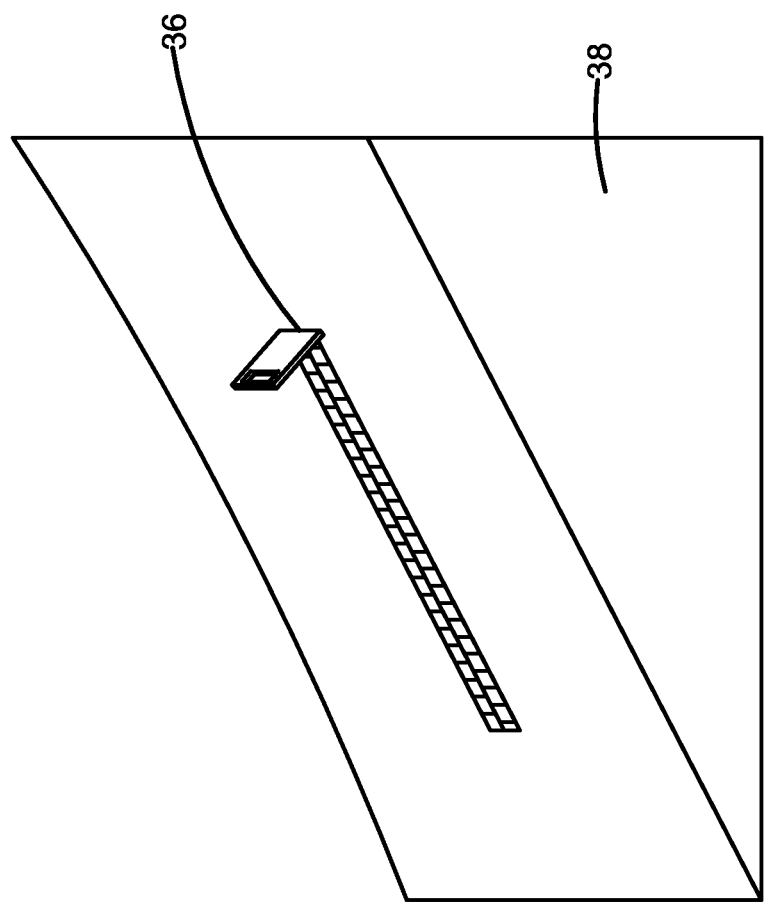
Figure 11:
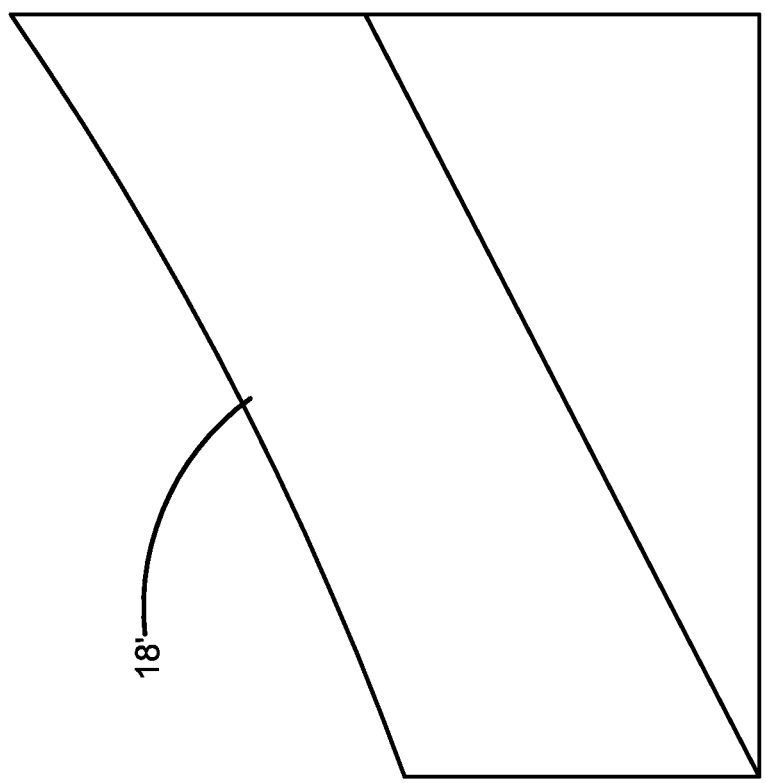
Figure 12:
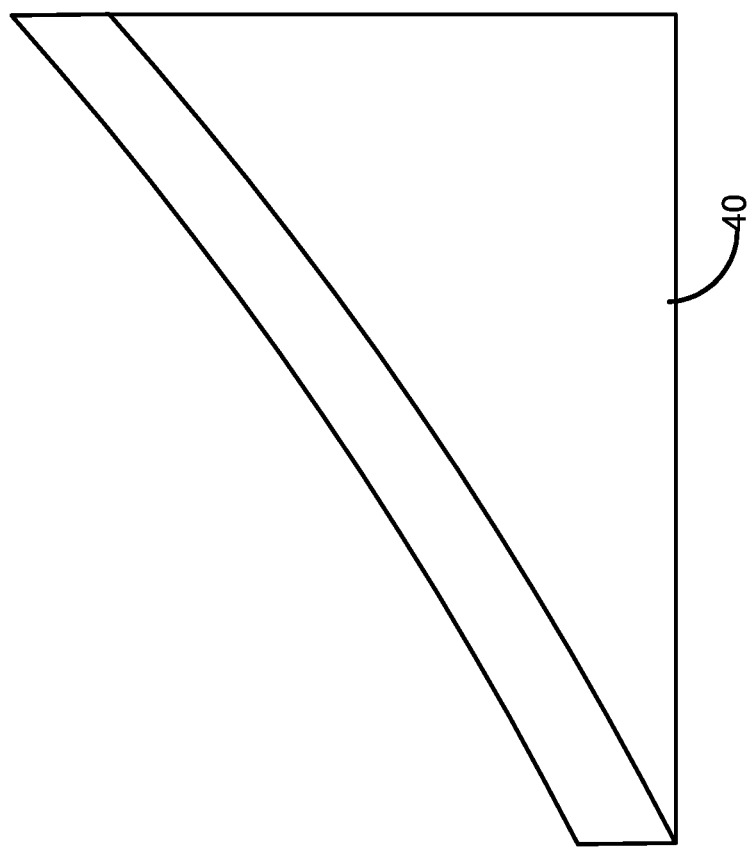
Figure 13:
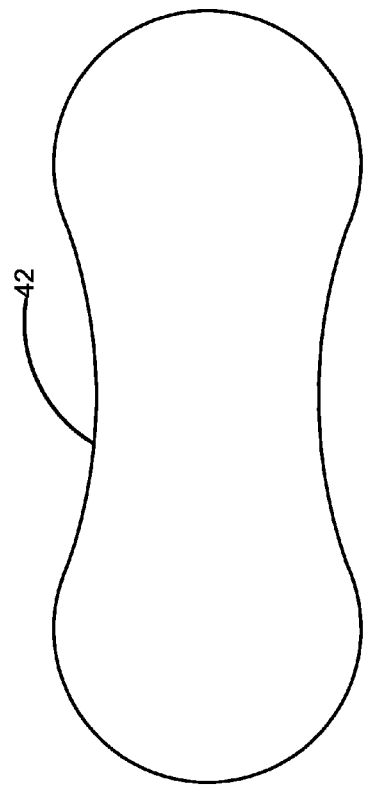
Figure 13:
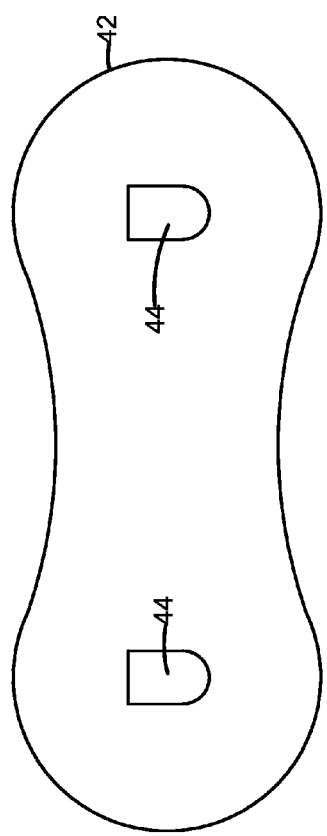
Figure 13:
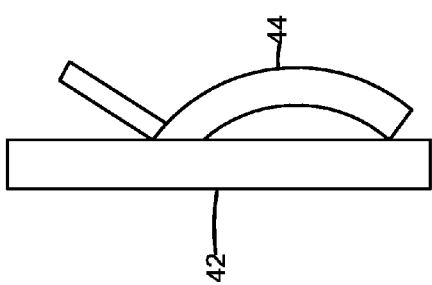
Figure 14:
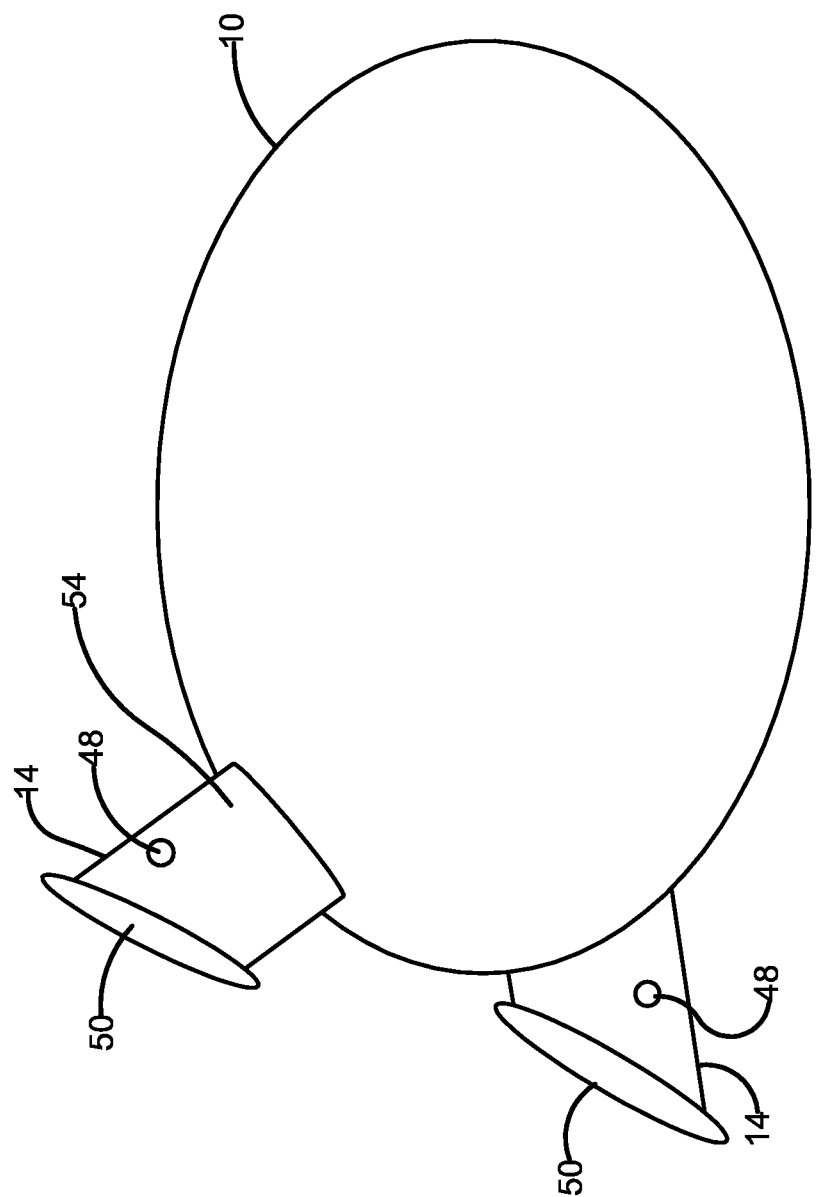
Figure 15:
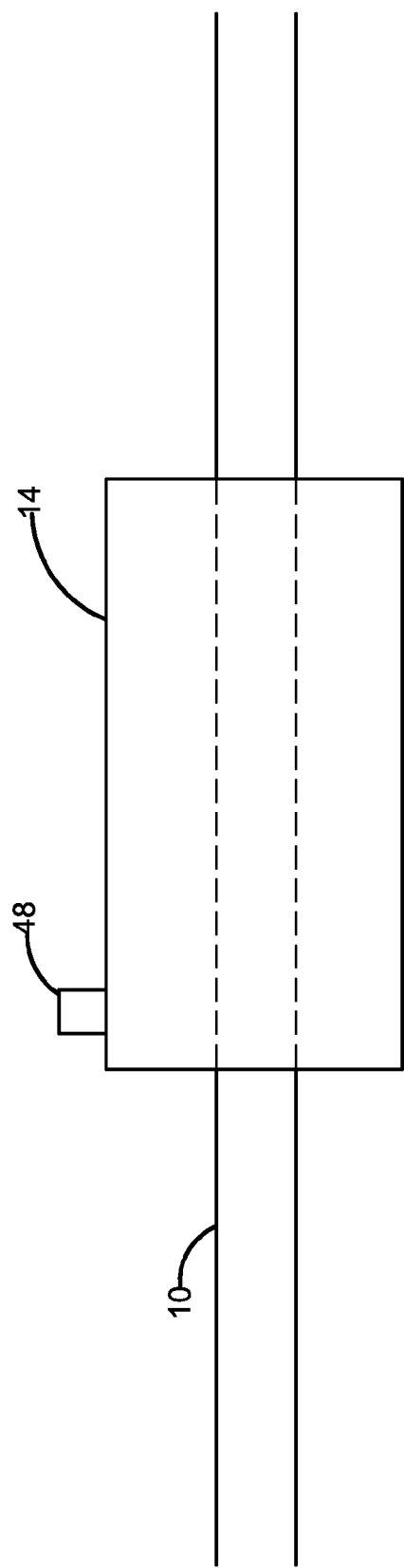
Figure 16:
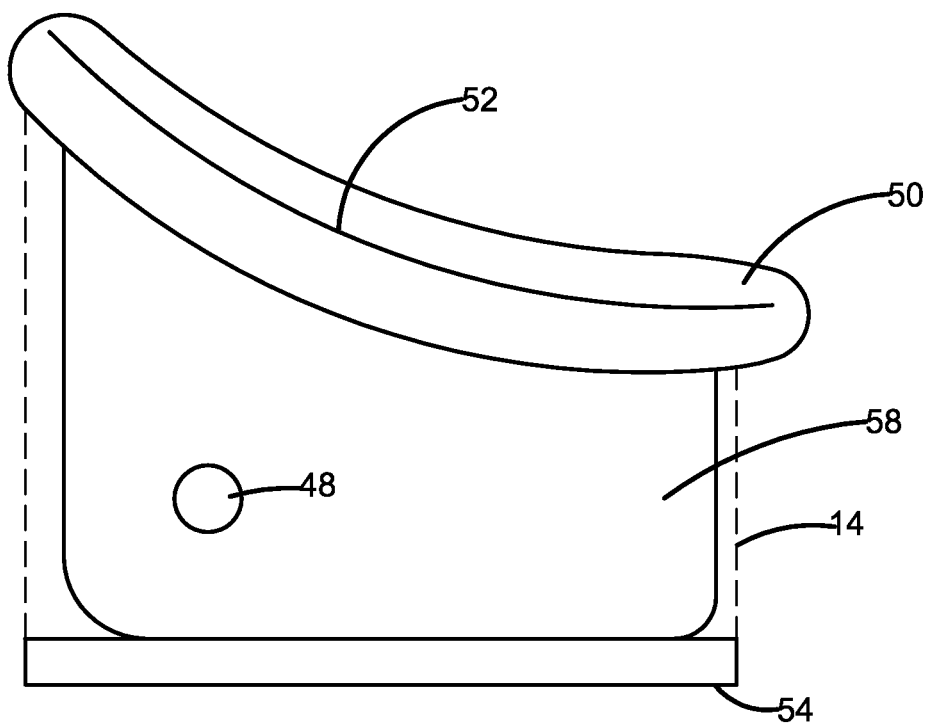
Figure 17:
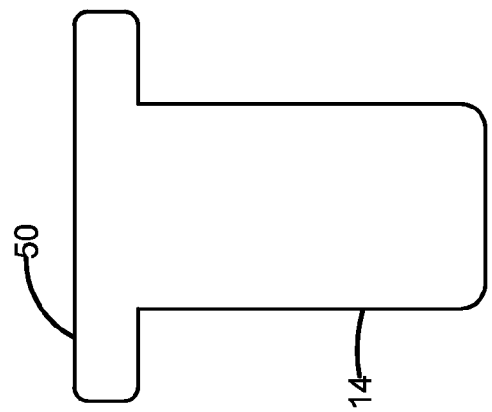
Figure 17:
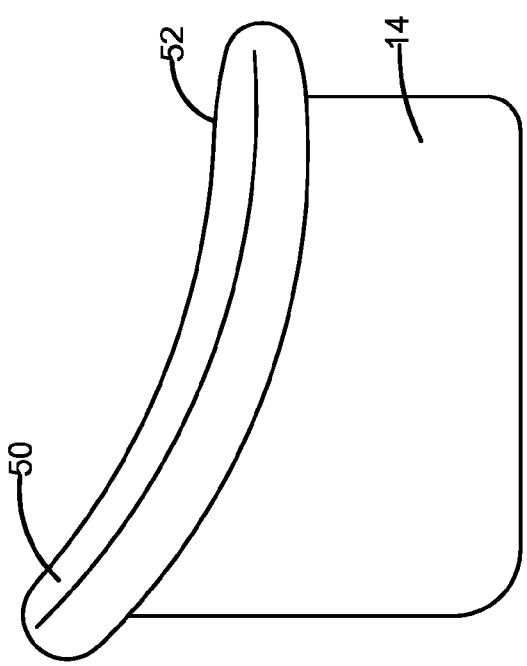
Figure 17:
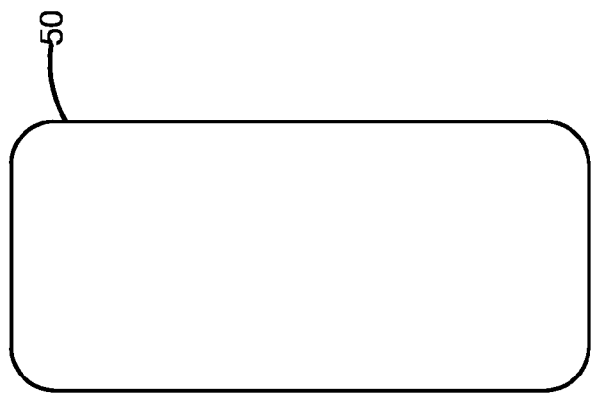
Figure 18:
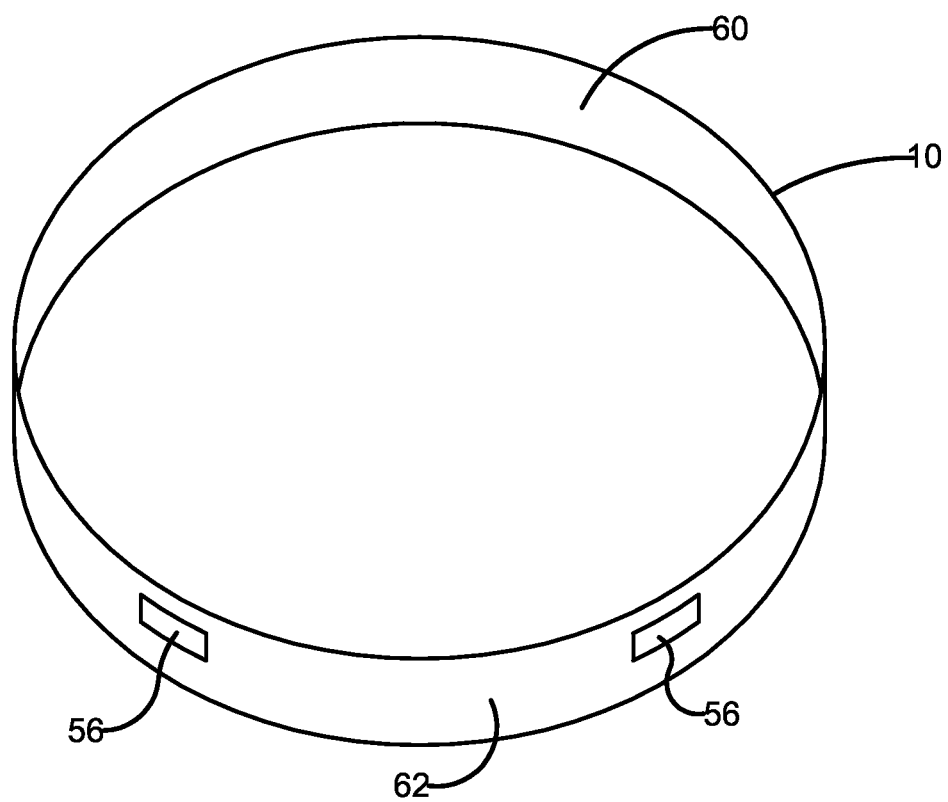
Figure 19:
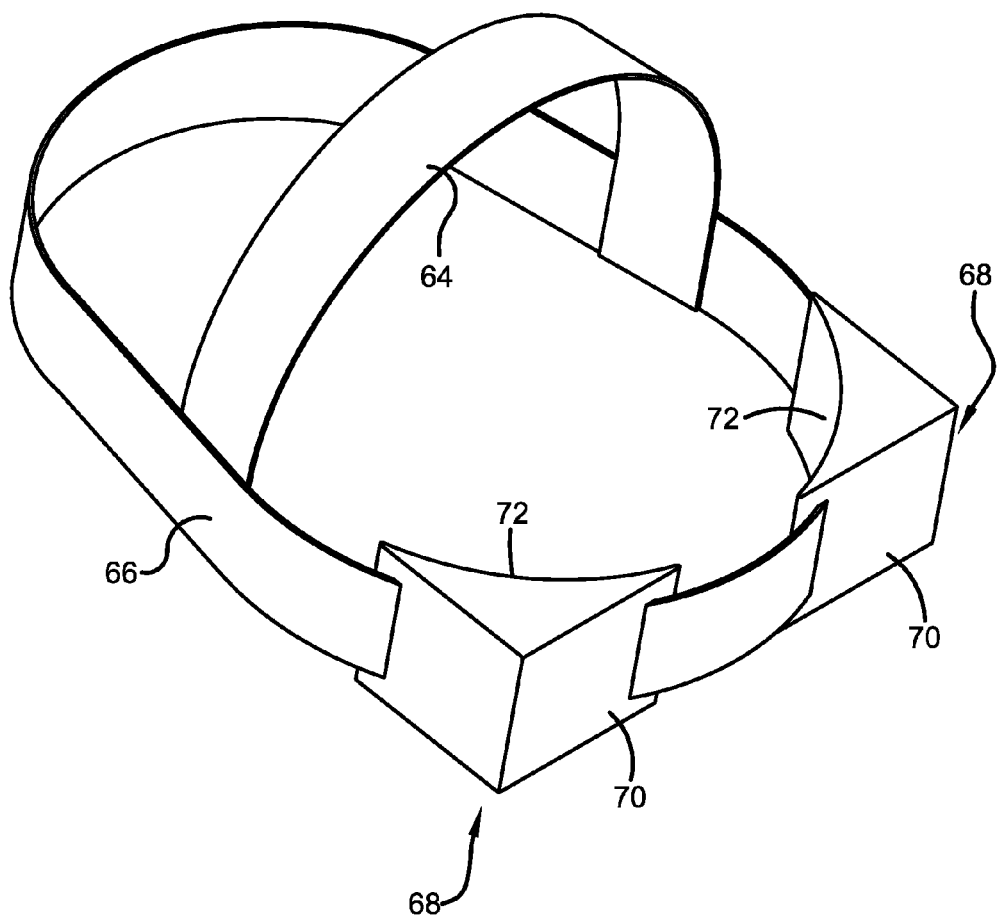
Figure 20:
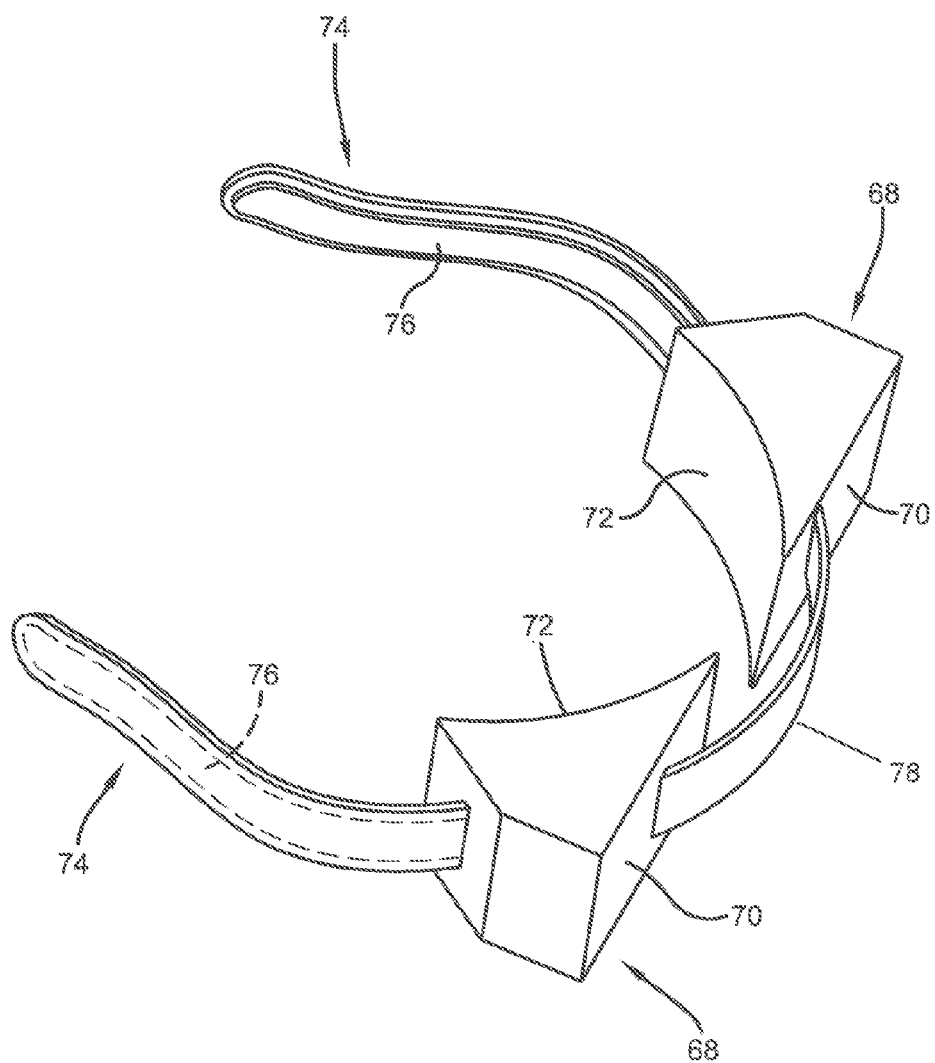

The invention may take physical form in certain parts and arrangement of parts, at least one embodiment of which will be described in detail in this specification and illustrated in the accompanying drawings which form a part hereof and wherein:

FIG. 1 shows a top view of the band and cushions;
FIG. 2 shows a top view of the band and another embodiment;
FIG. 3 shows a top view of the band, cushions, and adjustable clips;
FIG. 4 shows a top view of another embodiment of the band;
FIG. 5A shows a perspective view of the band;
FIG. 5B shows a perspective view of the holding device;
FIG. 5C shows a perspective view of one embodiment of the cushion;
FIG. 5D shows a perspective view of one embodiment of the cushion;
FIG. 6 shows a perspective view of the cushion and holder;
FIG. 7 shows a perspective view of the holder;
FIG. 8A shows a partial perspective view of the band;
FIG. 8B shows a perspective view of the clip;
FIG. 9A shows a perspective view of another embodiment;
FIG. 9B shows a back view of FIG. 9A;
FIG. 10 shows a perspective view of another embodiment;
FIG. 11 shows a perspective view of the cushion;
FIG. 12 shows a perspective view of another cushion embodiment;
FIG. 13A shows a front view of an eye cover;
FIG. 13B shows a back view of the eye cover;
FIG. 13C shows a side view of the eye cover;
FIG. 14 shows a perspective view of another embodiment;
FIG. 15 shows a perspective view of a holding device;
FIG. 16 shows a perspective view of another embodiment;
FIG. 17A shows a top view of the pocket;
FIG. 17B shows a side view of the pocket;
FIG. 17C shows a rear view of the pocket;
FIG. 18 shows a perspective view of the band;
FIG. 19 shows a perspective view of the band with an additional support band; and,
FIG. 20 shows a perspective view of the cushions with side supports.

IV. DETAILED DESCRIPTION

In reference to the FIGURES, an inventive headband 10 is shown having a holding device 14 for the cushion frame 16, which holds the cushion 18. In other embodiments, the cushion 18' is connected directly to the holding device 14, without a cushion frame 16. The headband 10 can also have adjusting clips 20. The cushion 18 can have a clip 24. In another embodiment, the cushion 18''' has an emerging portion 26, connecting pegs 28, tab 30, post 34, with teeth 32. The post 34 is connected to the emerging portion 26 of the cushion 18''' so that the cushion 18''' can be adjusted up and down as needed. The post 34 has teeth 32 on it, so that the post 34 can click into place, thereby holding the cushion 18''' in the desired location, and allowing for variability in the height adjustment. It is to be understood that any mechanism for variably adjusting the height can be used, as long as chosen using sound engineering judgment. Another embodiment has a cover 38, with zipper 36 for covering the cushion 18. Another embodiment has a curved cushion 40. In another embodiment, an eye cover 42 can be attached to the headband 10 with clips 44.

With continuing reference to FIG. 1, the headband 10 is designed to encircle a user's head (shown, but not referenced). In this embodiment, the band 10 is made of an elastic material, such that the band 10 can readily fit on a large variety of head types and sizes. Either fixedly or adjustably attached to the headband is at least two holding devices 14, to which are attached a cushion frame 16, for fixedly, removably holding the cushion 18. The cushion 18 can be used as a headrest against a seat back 12. In one embodiment, the holding device 14 allows the cushions 18 to be moved around the band 10, in order to provide optimal positioning.

With continuing reference to FIGS. 2-8B, another embodiment is shown. The headband 10 can have the cushions 18' attached directly to the holding devices 14. The cushions 18' can be selectively rotated around the headband 10 to allow for placement anywhere along the headband 10. In one embodiment, the cushions 18' are made of a foam material. It is to be understood that the cushion 18, 18', 18" can be made of any material suitable for use as a support for a user's head. The holding device 14 has two ends, with openings 22 for receiving the band 10. The openings 22 allow the holding device 14 to be moved anywhere along the length of the band 10. The cushion 18' is connected to the holding device 14, and the user adjusts the cushions 18' in order to position them such that the user's head can rest comfortably between the cushions 18' against the seat 12. The cushions 18' support the user's head, and keep the head from flopping when asleep. In one embodiment, the band 10 has clips 20, which are used to adjust the tightness of the band 10 around the user's head. With reference now to FIG. 4, in one embodiment, the band 10 only has one cushion 18' attached. The cushion 18' can be used as the user leans his head to the side against the cushion. In another embodiment, the cushion 18' can be used as a stand-alone unit, without the band 10.

With continuing reference to FIGS. 2-8B, the cushion 18' fits onto the holding device 14 with pegs 24. The holding device 14 has a receiving hole (shown but not referenced) which receives the peg 24. The peg 24, in this embodiment, is inserted into the cushion 18' in order to hold it in place. With the cushion 18' attached to the holding device 14, the entire apparatus can be moved along the length of the band 10, which is threaded through the openings 22 in the holding device 14. As can be seen in FIG. 7, the band 10 goes underneath the center portion of the holding device 14. The holding device 14, can have more than one receiving hole for attaching the cushion 18' to the holding device 14. It is to be understood that the cushion 18, 18', 18" can be attached to the holding device in any manner chosen using sound engineering judgment, including directly attaching the cushion 18 to the band 10 via hook-and-eye fasteners, snaps, buttons, etc. As can be seen in FIGS. 8A and 8B, the band 10 can be made of an elastic material, or may be made of a non-elastic material and have attachment clips 46, or any other means of attaching chosen using sound engineering judgment. The band 10 can either be slipped on over the head, or attached around the head.

With reference now to FIGS. 9A and 9B, another embodiment of the cushion 18 is shown. The cushion 18 could a container frame 16 and a cushion portion 26. The cushion portion 26 would reside in the frame 16, which would be attached to the band via pegs 28. The frame 16 could have one peg 28, which would allow tilting or angling of the frame 16, or could have two or more pegs 28 for holding the frame 16 in place. The cushion portion 26 could be selectively, adjustably removed from the frame 16, such that the cushion portion 26 could adjust to fit the space between the seat 12 and the user's head. A tab 30 allows for connection of the cushion portion 26 to the frame 16, and a rod 32, with teeth 34, allows for adjustability of the cushion portion 26. It is to be understood that any mechanism for allowing adjustability could be used, as long as chosen using sound engineering judgment.

With reference now to FIG. 10, another embodiment of the cushion 18 is shown. A decorative and/or protective cover 38 could be placed over the cushion, which would allow for protection of the cushion 18 from wear and tear, as well as dirt and germs. The cover 38 would allow for decorative purposes, but also the ability to use the cushion 18 for multiple users in a sanitary manner. The cover 38 is removably attached to the cushion 18, by any means chosen sound engineering judgment. Non-limiting examples would be a zipper or a hook and eye fastener 36.

With reference now to FIGS. 11 and 12, another embodiment of the cushion 18', 40 is shown. In FIG. 11, cushion 18' is shown, which can be used by itself, without the band 10. The cushion 18' can be placed between the user's head and the seat 12, to keep the user's head in place. FIG. 12 shows a curved cushion 40, which is more in line with the shape of a user's head. In these embodiments, the cushion 18', 40 is larger than the embodiments utilizing the band, as the stand-alone cushion 18', 40 would function more like a stand-alone pillow. In this embodiment, the cushion 18' has a slight concave portion for the user's head.

With reference now to FIGS. 13A, 13B, and 13C, eye protector 42 is shown. On the back of the eye protector 42, at least one clip 44 is attached in order to be removably attachable to the band 10. The eye protector 42 could also be retractably attached to the band 10, such that it can be used and stored within the band 10.

With reference now to FIGS. 14-18, another embodiment is shown, showing the band 10, holding device 14, bladder hole 48, cushion pockets 50, seam 52, holding bracket/pad 54, fasteners 56, bladder 58, and inside surface 60, and an outside surface 62. FIG. 14 shows an elastic headband 10 having two holding devices 14, having pockets 50 for holding the head. FIG. 15 shows the holding device 14 attached to the band 10. The device 14 allows for sliding movement around the band 10. FIG. 16 shows the device 14 with the bladder 56 inside, wherein the bladder 56 is filled with a fluid, gel, or some other malleable substance. In one example, the fluid could be air or water. In another example, the malleable substance could be plastic or rubber pellets. The bladder hole 48 allows for the introduction of air, water, or other fluid into the bladder 56. The bladder hole 48 also allows for the release of the air, water, or other fluid for more convenient storage when not in use. The pocket 50 has a seam which allows for introduction of a cushioning material inside the pocket 50, so that the pocket 50 can serve as a replaceable covering. In this embodiment, the device 14 is higher on the outside edge and lower on the inside edges, to allow for a more comfortable fit around the user's head. FIG. 18 shows the band 10 with inside surface 60 and outside surface 62. The fasteners 56, which in this embodiment are hook-and-eye fasteners, are located on the outside surface of the band 10, and allow for the selective removal of the device 14. In this embodiment, the device 14 would have a corresponding hook-and-eye fastener. It is to be understood that any mechanism for allowing the device 14 to be removably attachable can be used, as long as chosen using sound engineering judgment.

In reference to FIG. 19, a band 66 goes around the circumference of the user's head, a second band 64 to across the top of the user's head, wherein the second band 64 is connected at both ends to the band 66, two cushions 68, wherein the two cushions 68 have substantially flat surfaces 70. In this embodiment, the cushions 68 are attached to the band 66 in any of the manners described in the previous paragraphs. The bands 65, 66 are both elastic in this embodiment, but it is to be understood that they could be any type of adjustable band. The cushions 68 are curved to fit the contours of the user's head.

In reference to FIG. 20, the cushions 68 have a flat surface 70 and a curved surface 72. The cushions 68 are attached to an elastic band 78 in the front, and are adjustable in any manner described in the previous paragraphs. A side arm 74 is attached to each of the cushions 68, wherein the side arms 74 are designed to be worn on the sides of the user's head, similar to the arms of glasses. The arms 74 can be made of any firm material, such as plastic, and, in this embodiment, have a thin foam cushion 76 on the inside to cushion the user's head. As with the other bands described, this current embodiment is adjustable, and may be worn on any part of the head.

It is to be understood that the present invention is not limited in the number of cushions, the number of adjustment clips, the number of holding devices, or the materials of which any of the components are made.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

1. An adjustable device for supporting a user's head, the device comprising:
   a headband, the headband having an inside surface and an outside surface;
   at least two cushions, wherein the cushions are removably attachable to the outside surface of the headband, wherein the cushions are slidably adjustable along the headband, wherein the cushions have a first side, a second side, and a third side, each of the three sides having a first end and a second end, wherein the first side has a curved surface, and the second and third sides have a flat surface, wherein the first end of the second side and the first end of the third side are connected at a substantially 90 degree angle, wherein the second end of the second side and the first end of the first side are attached and the second end of the third side and the second end of the first side are attached; and,
   a second band, wherein the second band has first and second ends, wherein the first and second ends of the second band are attached to the inside or outside surface.

2. The device of claim 1, wherein the device further comprises:
   at least one holding device for holding the cushions, wherein the holding device is slidably adjustable along the headband.

3. The device of claim 1, wherein the headband is made of an elastic material.

4. The device of claim 1, wherein the headband has two ends that can be connected to each other, wherein the size of the headband is adjustable.

5. The device of claim 1, wherein the cushions have a removable cover.

6. The device of claim 1, wherein the device further comprises:
   selectively removable eye protection, wherein the eye protection can he selectively attached to the headband.

7. An adjustable device for supporting a user's head, the device comprising:
   at least two cushions, wherein the cushions are removably attachable to an elastic band, wherein the cushions are slidably adjustable along the elastic band, wherein the cushions have a first side, a second side, a third side and a fourth side, each of the four sides having a first end and a second end, wherein the first side has a curved surface, and the second, third, and fourth sides have flat surface, wherein the first end of the second side and the first end of the third side are connected at a substantially 90 degree angle, wherein the second end of the second side and the first end of the first side are attached and the second end of the third side and the first end of the fourth side are attached at an angle more than 90 degrees and less than 180 degrees, and the second end of the fourth side and the second end of the first side are attached; and,
   two substantially rigid side arms, wherein the side arms are attached to the cushions.

8. The device of claim 7, wherein the side arms are flexibly rigid.

9. The device of claim 8, wherein the side arms have an inside surface and an outside surface, wherein the inside surface has padding.

10. The device of claim 9, wherein the each, side arm projects outwardly from a different cushion, wherein each side arm projects from the surface of the fourth side of each cushion.

11. The device of claim 10, wherein the side arms are curved to match the contour of an associated user's head.

12. The device of claim 11, wherein the cushions have a flat outer surface and a curved inner surface.

13. The device of claim 1, wherein the second band is attached to the inside surface.

14. The device of claim 1, wherein the headband has a left side and a right side, wherein the first end of the second band is attached to the left side and the second end of the second band is attached to the right side.

15. The device of claim 14, wherein the second band is attached perpendicular to the headband.

16. The device of claim 2, wherein the holding device is rigid.

17. The device of claim 16, wherein the cushions can be clipped into the holding device.

* * * * *